United States Patent
Ewel et al.

(10) Patent No.: US 10,358,093 B1
(45) Date of Patent: Jul. 23, 2019

(54) LOCKING BACKPACK HOLDER

(71) Applicant: Ford Global Technologies, LLC, Dearborn, MI (US)

(72) Inventors: Adam D. Ewel, Royal Oak, MI (US); Jimmy Moua, Canton, MI (US); Gregory Hagedorn, Bloomfield Hills, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/968,086

(22) Filed: May 1, 2018

(51) Int. Cl.
*A47C 7/62* (2006.01)
*A47C 7/64* (2006.01)
*B60R 7/04* (2006.01)
*F16B 45/06* (2006.01)

(52) U.S. Cl.
CPC .............. *B60R 7/043* (2013.01); *F16B 45/06* (2013.01)

(58) Field of Classification Search
CPC .................................. B60R 7/043; F16B 45/06
USPC .................... 297/188.03, 188.04, 188.06
See application file for complete search history.

(56) References Cited

U.S. PATENT DOCUMENTS

| | | | | |
|---|---|---|---|---|
| 185,512 A * | 12/1876 | Floyd ..................... | B60N 2/305 |
| | | | 297/188.03 X |
| 2,033,520 A * | 3/1936 | Gubitz .................. | B60N 2/643 |
| | | | 297/188.03 |
| 2,262,581 A * | 11/1941 | Emery .................... | A47C 7/64 |
| | | | 297/188.03 X |
| D156,691 S * | 1/1950 | Belmont .................. | 297/188.03 |
| 2,591,381 A * | 4/1952 | Scott-Dalgeish ........ | A47C 7/64 |
| | | | 297/188.03 |
| 2,692,688 A * | 10/1954 | Callais .................... | A47C 7/64 |
| | | | 297/188.03 X |
| D173,386 S * | 11/1954 | Ryan ....................... | 297/188.03 |
| 3,149,879 A * | 9/1964 | Steiber ................... | A47C 7/64 |
| | | | 297/188.03 X |
| 4,711,488 A * | 12/1987 | Ohanessian ............. | A47C 7/64 |
| | | | 297/188.03 |
| 4,957,230 A * | 9/1990 | Gonzales ............... | A47G 25/14 |
| | | | 297/188.03 X |
| 5,058,790 A * | 10/1991 | LaVelle ................... | A47C 7/64 |
| | | | 297/188.03 X |
| 5,415,457 A | 5/1995 | Kifer | |
| 5,836,646 A * | 11/1998 | Salehi ..................... | A47C 7/62 |
| | | | 297/188.04 |
| 5,863,092 A * | 1/1999 | Kifer ....................... | B60R 7/043 |
| | | | 297/188.04 |
| 6,126,235 A * | 10/2000 | Grove ..................... | A47C 7/425 |
| | | | 297/188.03 |
| 6,199,948 B1 | 3/2001 | Bush et al. | |
| 6,443,523 B1 * | 9/2002 | Reitze ..................... | B60R 7/043 |
| | | | 297/188.03 |

(Continued)

FOREIGN PATENT DOCUMENTS

CN 203819140 U 9/2014

*Primary Examiner* — Rodney B White
(74) *Attorney, Agent, or Firm* — Vichit Chea; Price Heneveld LLP (57) ABSTRACT

A vehicle seating assembly includes a seat. A seatback includes a seatback frame and a rearward facing surface. A selectively attachable hanger assembly is disposed on the rearward facing surface and mounted to a bracket attached to the seatback frame.

20 Claims, 12 Drawing Sheets

(56) References Cited

U.S. PATENT DOCUMENTS

| | | | |
|---|---|---|---|
| 6,450,571 B1* | 9/2002 | Canni | B60N 2/643 |
| | | | 297/188.04 |
| 6,808,093 B1* | 10/2004 | Lin | A47C 7/64 |
| | | | 297/188.03 X |
| 7,063,381 B2* | 6/2006 | Scahill | A47C 7/64 |
| | | | 297/188.03 X |
| 7,395,997 B2* | 7/2008 | Padden | B60R 7/10 |
| | | | 297/188.03 X |
| 7,669,821 B2 | 3/2010 | Mratin | |
| 7,784,864 B2* | 8/2010 | Feder | B60R 7/043 |
| | | | 297/188.03 X |
| 8,397,963 B2* | 3/2013 | Singh | B60N 3/004 |
| | | | 297/188.04 X |
| 8,573,689 B2* | 11/2013 | Golo | B60R 7/10 |
| | | | 297/188.03 X |
| 8,696,057 B2* | 4/2014 | Wang | B60R 11/02 |
| | | | 297/188.03 X |
| 8,801,092 B2* | 8/2014 | Gausrab | B60J 7/223 |
| | | | 297/188.03 X |
| 2003/0184134 A1* | 10/2003 | Liu | A47C 7/64 |
| | | | 297/188.03 |
| 2005/0161480 A1 | 7/2005 | Tirey | |
| 2005/0225129 A1* | 10/2005 | Scahill | A47C 7/64 |
| | | | 297/188.04 |
| 2005/0248189 A1 | 11/2005 | Prasatek et al. | |
| 2011/0109129 A1* | 5/2011 | Brill | B60N 3/004 |
| | | | 297/188.04 |
| 2012/0205948 A1* | 8/2012 | Okuda et al. | A47C 7/40 |
| | | | 297/188.03 |
| 2013/0221712 A1* | 8/2013 | Sanchez | B60N 2/838 |
| | | | 297/188.03 |
| 2018/0222400 A1* | 8/2018 | Neumann | B60R 11/02 |

\* cited by examiner

LOCKING BACKPACK HOLDER

FIELD OF THE DISCLOSURE

The present disclosure generally relates to vehicle seating assemblies, and more particularly to storage areas for vehicle seating assemblies.

BACKGROUND OF THE DISCLOSURE

Seating assemblies typically include a seatback to support a back of an occupant in an upright sitting position and various reclined positions. Similar to other areas of a vehicle interior, such as consoles and door trim panels, seatbacks commonly include storage areas for passenger items. However, improved seatback storage areas for passenger items are always desired.

SUMMARY OF THE DISCLOSURE

According to one aspect of the present disclosure, a vehicle seating assembly includes a seat. A seatback includes a seatback frame and a rearward facing surface. A selectively attachable hanger assembly is disposed on the rearward facing surface and mounted to a bracket attached to the seatback frame.

Aspects of the first aspect of the disclosure can include any one or a combination of the following features:
- the hanger assembly includes a hanger, a lock member, and a housing assembly that partially encloses the hanger and the lock member, wherein the hanger and the lock member are rotationally coupled along an axis defined by centerlines of the hanger and the lock member, and wherein the hanger is movable from a first position to a second position to move the lock member from a first state to a second state;
- the first state comprises an unfixed position and the second state comprises a fixed position;
- the unfixed position includes an outer periphery of a lock member disposed within an inner periphery of an aperture of the bracket;
- the hanger is rotated from the first position to the second position to move the lock member from the unfixed position to the fixed position;
- the fixed position comprises an interference fit between a nub of the lock member and a seatback facing surface of the bracket;
- the hanger comprises a first hanger and a second hanger disposed on opposing sides of the housing assembly;
- a gear assembly is disposed within the housing assembly and between the first hanger and the second hanger; and
- the first position includes the hanger in a substantially vertical position and the second position includes the hanger in a substantially horizontal position.

According to another aspect of the present disclosure, a hanger assembly for a seatback includes a housing assembly having outward facing and seatback facing portions. A hanger extends from the outward facing portion. A lock member extends from the seatback facing portion and is rotationally coupled with the hanger. The hanger is selectively and alternatively positionable in first or second positions to respectively detach or attach the hanger assembly to a seatback frame assembly.

Aspects of the second aspect of the disclosure can include any one or a combination of the following features:
- the hanger and the lock member are aligned along an axis transverse to a seatback surface, wherein a fastener is disposed along the axis, and wherein the fastener couples the hanger to the lock member;
- the hanger comprises a first hanger and a second hanger disposed on a first side and a second side of the housing assembly;
- a first gear part of a gear assembly is disposed around the first hanger and a second gear part of the gear assembly is disposed around the second hanger, wherein the housing assembly encloses the first and second gear parts, wherein the first and second gear parts are rotationally coupled to the respective first and second hangers, and wherein the first and second gear parts form an interference fit to stabilize the first and second hangers;
- the interference fit comprises an interface between a first set of teeth disposed about a first circular perimeter of the first gear part and a second set of teeth disposed about a second circular perimeter of the second gear part;
- the first hanger is selectively movable from a first position to a second position to activate a first lock member to attach the hanger assembly to the seatback frame assembly and wherein the second hanger is simultaneously selectively movable from a first position to a second position to activate a second lock member to attach the hanger assembly to the seatback frame assembly; and
- the first position of the first hanger is a substantially vertical position and the second position of the first hanger is a substantially horizontal position and wherein the first hanger is rotated in a counterclockwise direction from the substantially vertical position of the first hanger to the substantially horizontal position of the first hanger and wherein the first position of the second hanger is a substantially vertical position and the second position of the second hanger is a substantially horizontal position and wherein the second hanger is rotated in a clockwise direction from the substantially vertical position of the second hanger to the substantially horizontal position of the second hanger.

According to yet another aspect of the present disclosure, a system of attachment points for a vehicle seatback includes a seatback having a frame assembly including first, second, and third brackets having respective first, second, and third apertures. A selectively attachable storage member includes a mounting member for securing the selectively attachable storage member to the third aperture of the third bracket.

Aspects of the third aspect of the disclosure can include any one or a combination of the following features:
- the selectively attachable storage member comprises a first mounting member and a second mounting member and wherein the first mounting member is inserted in the first aperture of the first bracket and the second mounting member is inserted in the second aperture of the second bracket;
- the selectively attachable storage member is a hanger assembly; and
- the selectively attachable storage member is a panel assembly.

These and other aspects, objects, and features of the present disclosure will be understood and appreciated by those skilled in the art upon studying the following specification, claims, and appended drawings.

DETAILED DESCRIPTION

Figure 1:
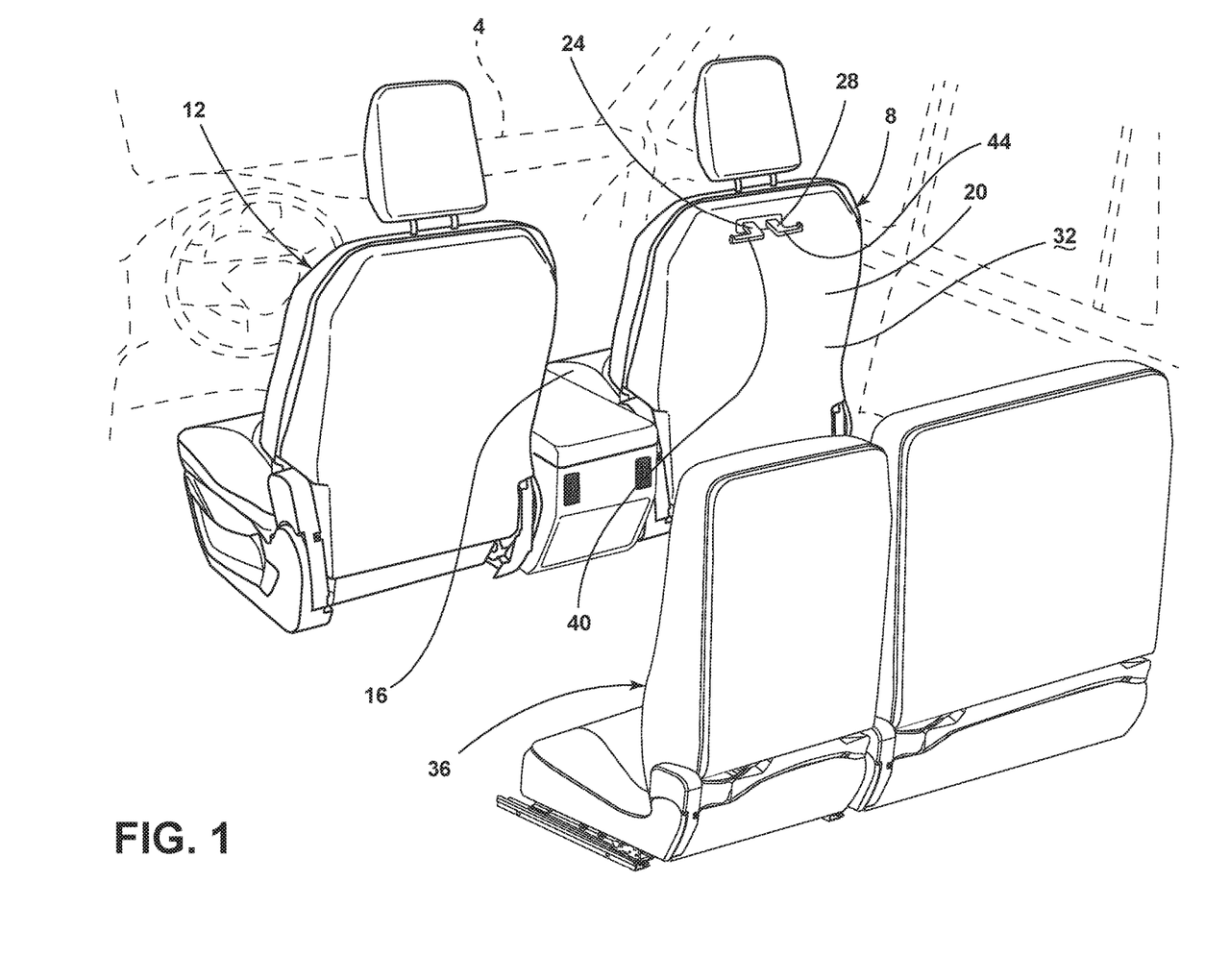
FIG. 1 is a side perspective view of a vehicle interior with a seatback including the hanger assembly, according to one embodiment.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle interior 4 includes a passenger side seating assembly 8 and a driver side seating assembly 12. The passenger side seating assembly 8 is equipped with a seat 16 and a seatback 20 with first and second hangers 24, 28 for storing one or more passenger items. The first and second hangers 24, 28 protrude from a rearward facing seatback surface 32 towards rear seats 36. The first and second hangers 24, 28 include horizontally oriented outward facing first and second portions 40, 44. The driver may store passenger items, such as a backpack 48 (FIG. 2), on the first and second hangers 24, 28. Passengers seated in the rear seats 36 may access passenger items stored on the first and second hangers 24, 28. The first and second hangers 24, 28 are also accessible to the driver in the driver side seating assembly 12.

Figure 2:
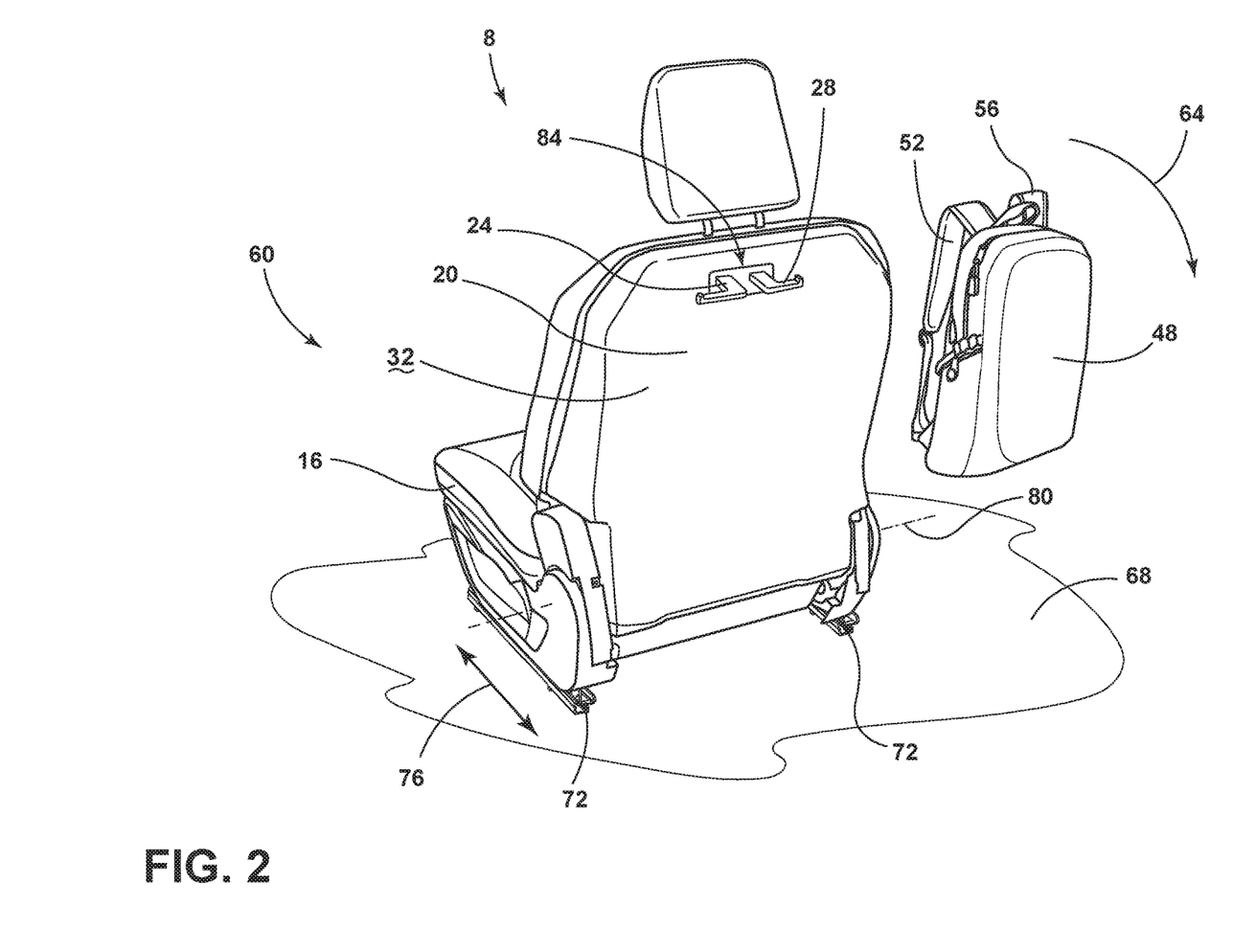
FIG. 2 is a side perspective view of the seatback including the hanger assembly of FIG. 1 and a backpack.
Figure 3:
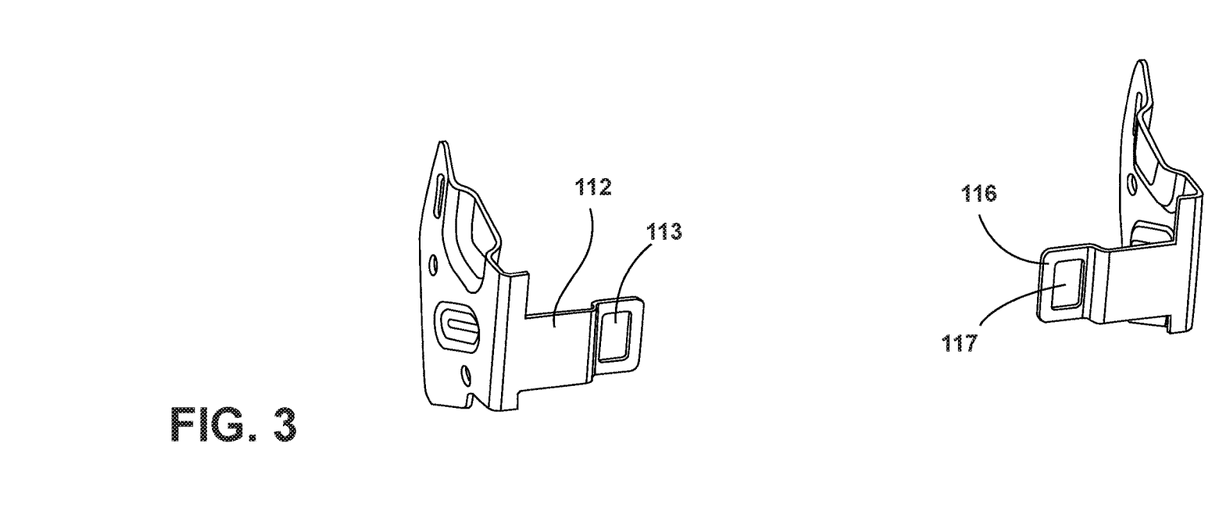
FIG. 3 is a perspective view of a first bracket and a second bracket of a frame assembly, according to one embodiment.
Figure 4:
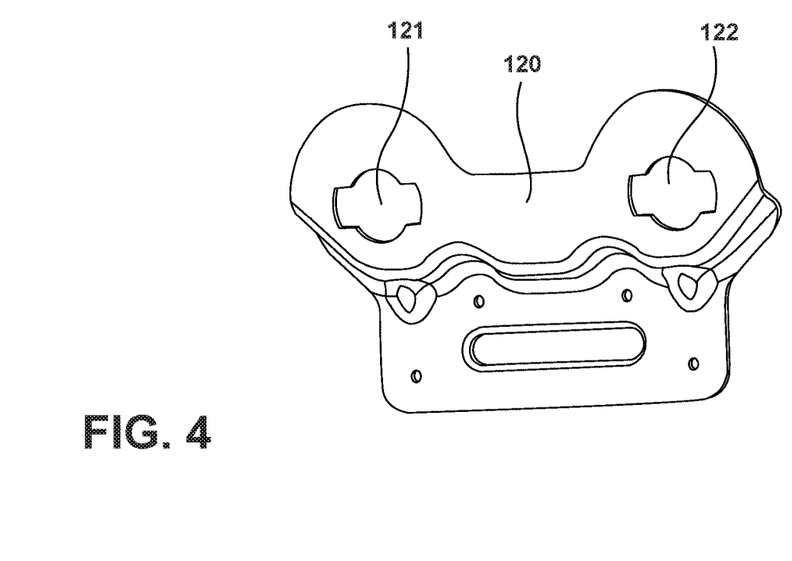
FIG. 4 is a top elevational view of a third bracket of the frame assembly, according to one embodiment.
Figure 5:
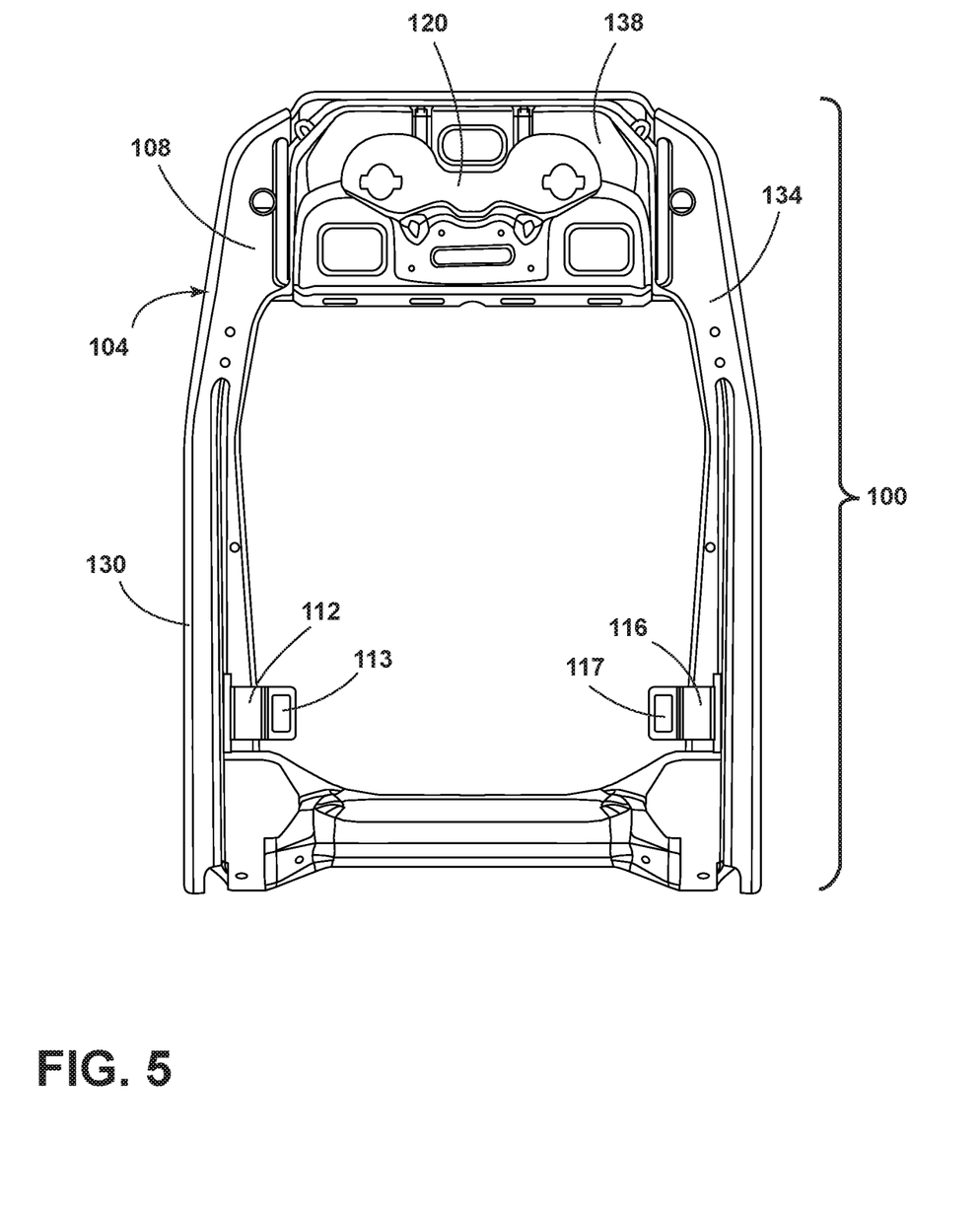
FIG. 5 is a back elevational view of a frame assembly of an embodiment.

Referring to FIG. 2, the passenger side seating assembly 8 includes a seat 16 and a seatback 20 with first and second hangers 24, 28. The first and second hangers 24, 28 are positioned so that a first strap 52 of the backpack 48 may be hung on the first hanger 24 and a second strap 56 of the backpack 48 may be hung on the second hanger 28 to suspend the backpack 48 from the seatback 20. In various travel conditions, a passenger may recline the seatback 20 in the direction depicted by an arrow 64 to provide a more comfortable sitting or sleeping position. When the seatback 20 is reclined, the backpack first and second straps 52, 56 remain suspended on the first and second hangers 24, 28 and the backpack 48 conveniently moves with the seatback 20.

Referring again to FIG. 2, the passenger side seating assembly 8 is coupled to a floor 68 with rails 72. The passenger side seating assembly 8 is movable along the rails 72 in a longitudinal direction shown by an arrow 76. The seatback 20 is pivotally coupled to the seat 16 and rotates around an axis 80 defined by a pivotable coupling between the seat 16 and the seatback 20. The first and second hangers 24, 28 are typically components of a hanger assembly 84 disposed on the rearward facing seatback surface 32.

Referring to FIGS. 3-15, in various embodiments, the hanger assembly 84 is one of a series of selectively attachable storage members that may be secured to a universal system of attachment points 100 of a frame assembly 104 of the passenger seatback 20. The frame assembly 104 includes a frame 108, a first bracket 112, a second bracket 116, and a third bracket 120. In the depicted embodiment, the universal system of attachment points 100 includes a first aperture 113 in the first bracket 112, a second aperture 117 in the second bracket 116, and third and fourth apertures 121, 122 on the third bracket 120. The universal system of attachment points 100 on the frame assembly 104 in the passenger seatback 20 allows selectively attachable storage members to be added to the frame assembly 104. The storage members include assemblies such as the hanger assembly 84 that is typically attached to the third bracket 120. The storage members also include panel assemblies that are typically fastened to the first bracket 112, the second bracket 116, and the third bracket 120. Interchangeable storage members with unique features may be selectively added to and removed from the frame assembly 104. The storage members may be purchased at the time of an initial vehicle purchase or as aftermarket items.

Figure 6:
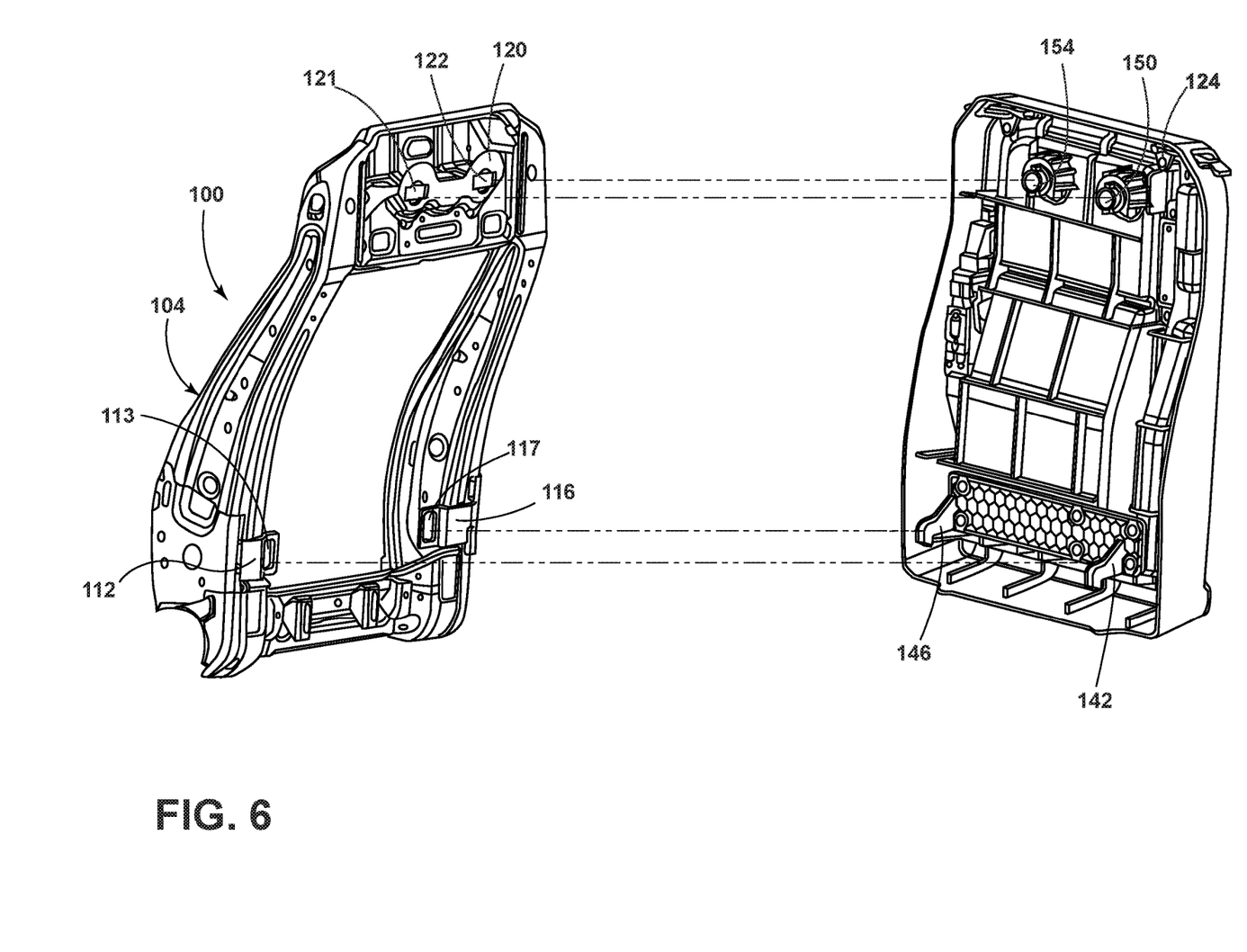
FIG. 6 is a perspective view showing a panel assembly attached to a frame assembly of an embodiment.
Figure 7:
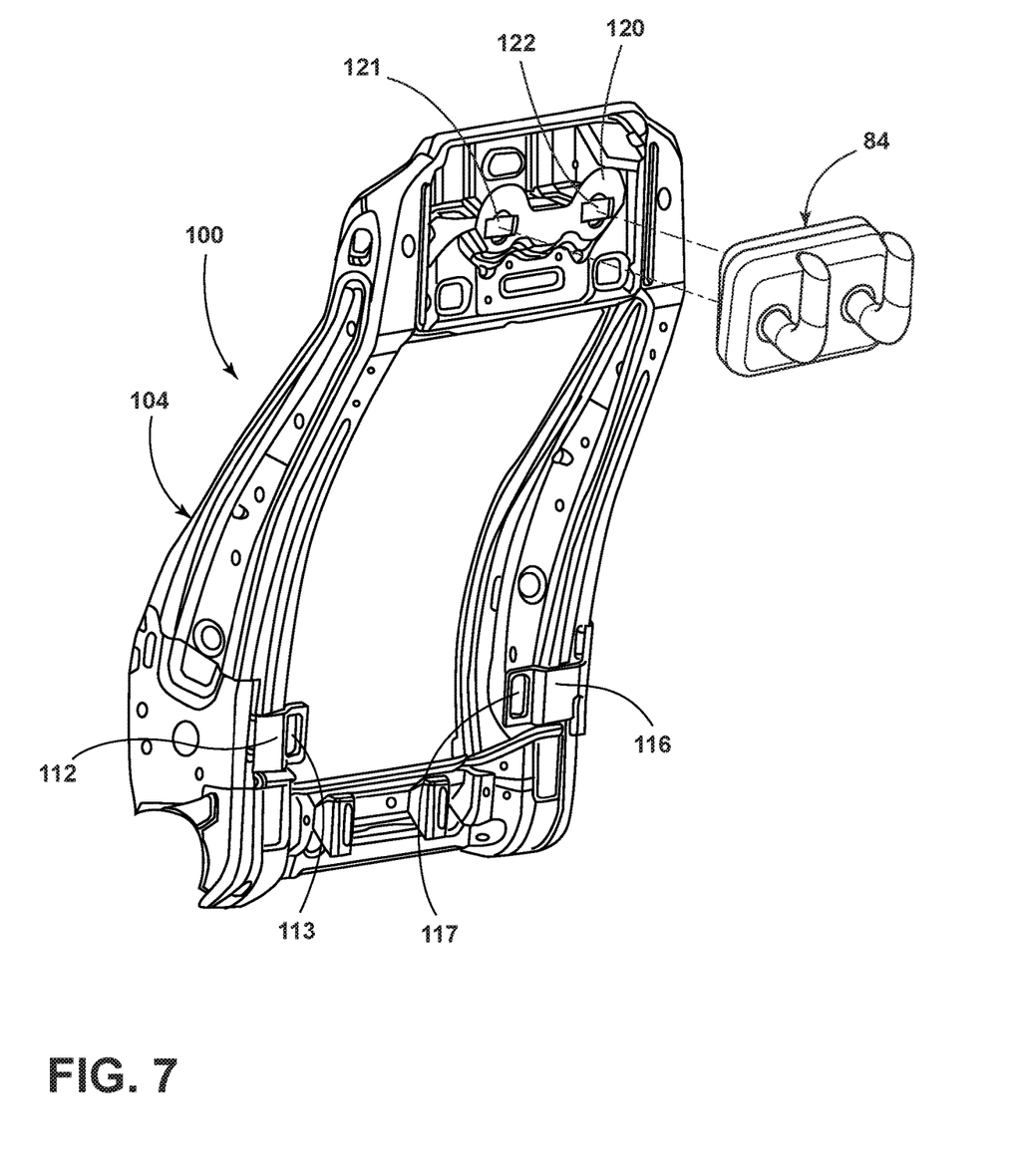
FIG. 7 is a perspective view showing a hanger assembly attached to a frame assembly of an embodiment.

Referring now to FIGS. 3-8, the frame assembly 104 includes a frame 108, a first bracket 112, a second bracket 116, and a third bracket 120. The first bracket 112 is attached to a first side 130 of the frame 108, and the second bracket 116 is attached to a second side 134 of the frame 108. The third bracket 120 is attached to an upper area 138 of the frame 108. With reference to FIG. 6, the first bracket 112, the second bracket 116, and the third bracket 120 are configured to receive a selectively attachable storage member (storage container 124) that includes a first protrusion 142, a second protrusion 146, a first mounting member 150, and a second mounting member 154. The first protrusion 142 is inserted in the first aperture 113 of the first bracket 112, and the second protrusion 146 is inserted in the second aperture 117 of the second bracket 116. The first and second mounting members 150, 154 (e.g., cam latches) secure the upper portion of the storage member to the third and fourth apertures 121, 122 in the third bracket 120. With reference to FIG. 7, in various aspects, the storage member may be a hanger assembly 84 that attaches to the third bracket 120.

Figure 8:
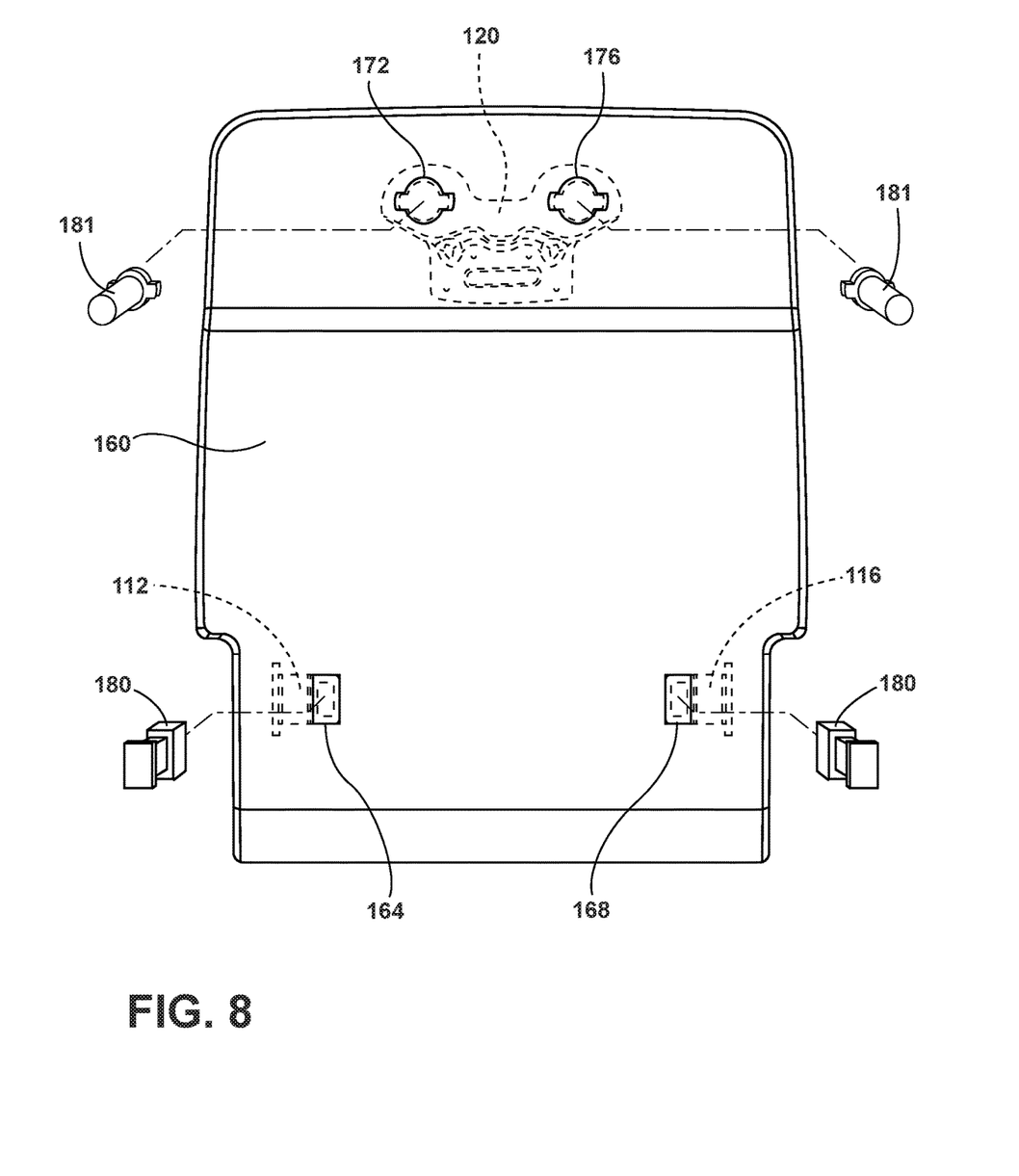
FIG. 8 is a back elevational view of a cover attached to a frame assembly of an embodiment.

Referring now to FIG. 8, in various aspects of the disclosure, a cover 160 is attached over the frame assembly 104. The cover 160 includes a first opening 164 that corresponds to the first aperture 113 in the first bracket 112, a second opening 168 that corresponds to the second aperture 117 in the second bracket 116, and third and fourth openings 172, 176 that correspond to third and fourth apertures 121, 122 in the third bracket 120.

Referring to FIGS. 6-8, the cover 160 is typically secured to the frame assembly 104 with fasteners. The cover 160 is typically shaped to fit over the contours of the frame assembly 104. In various embodiments, the cover 160 may be a polypropylene plastic. When the hanger assembly 84 is secured to the frame assembly 104 and the cover 160, the first opening 164 and the second opening 168 of the cover 160 may be concealed with plugs 180. When the hanger assembly 84 is detached from the third opening 172 and the fourth opening 176 of the cover 160, the third opening 172 and the fourth opening 176 may be concealed with plugs 181. The plugs prevent passengers from inserting trash or other items in the first opening 164, the second opening 168, the third opening 172, and the fourth opening 176.

Figure 9:
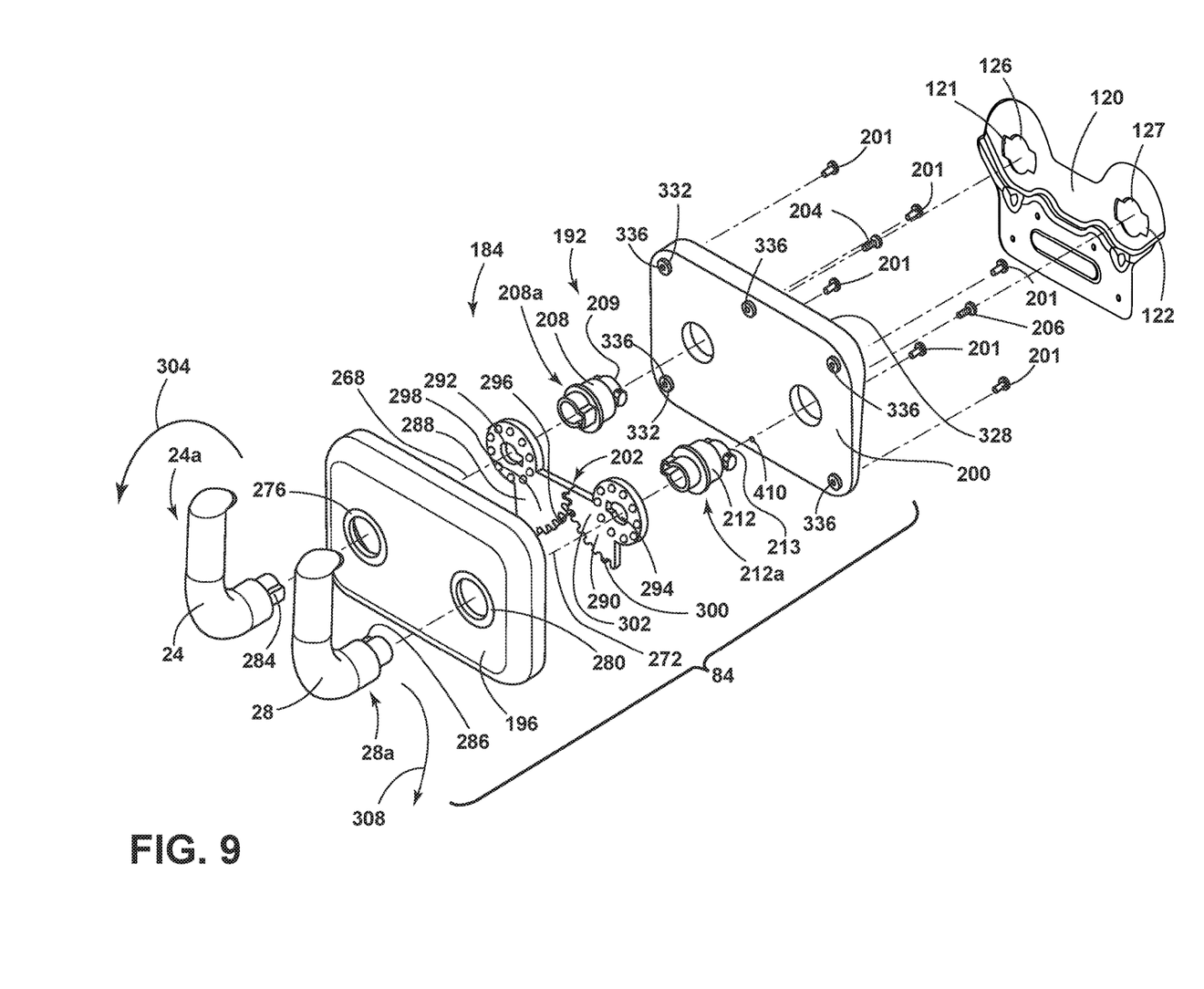
FIG. 9 is an exploded view of the hanger assembly in a first position according to an embodiment.
Figure 10:
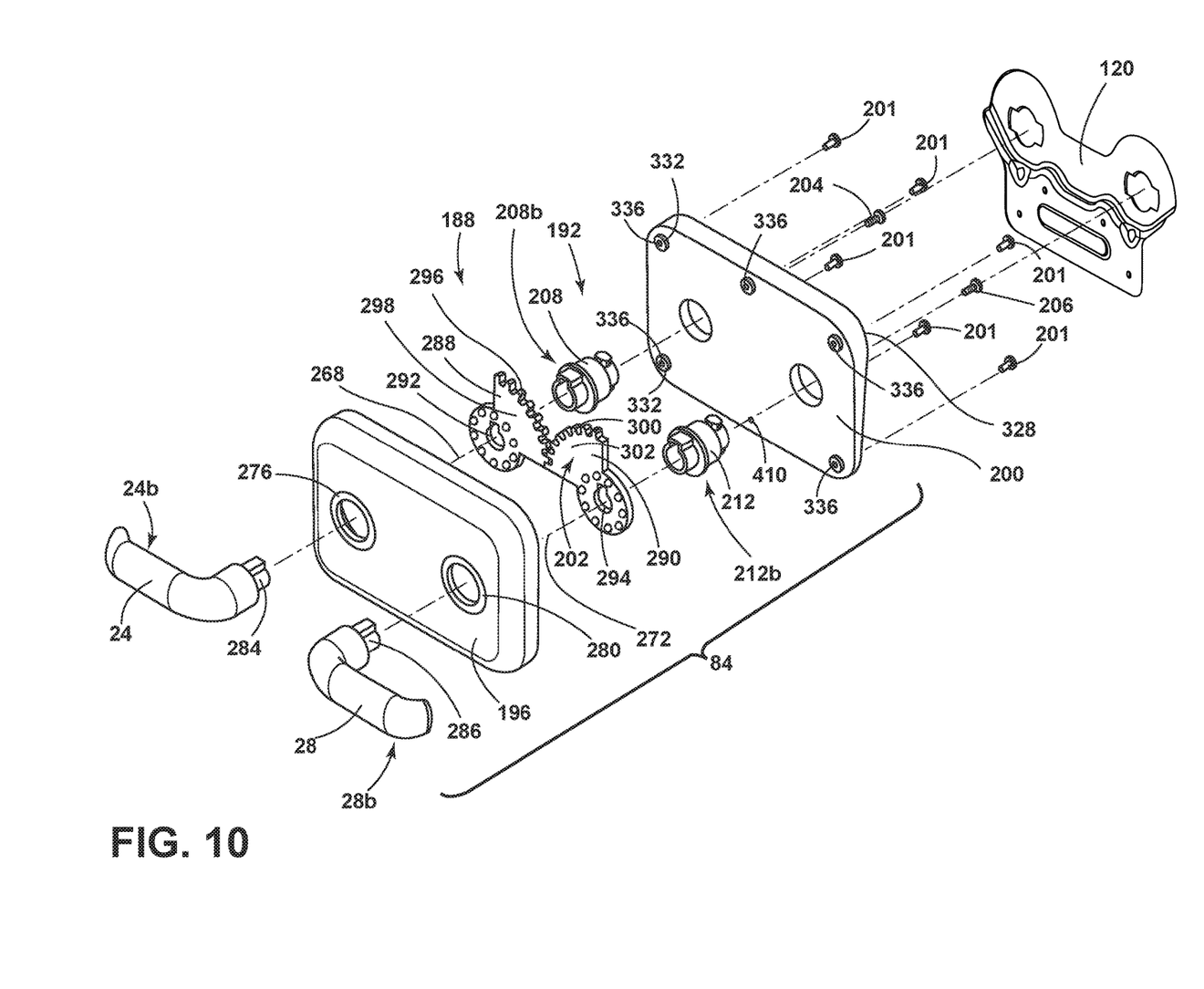
FIG. 10 is an exploded view of the hanger assembly in a second position according to an embodiment.

Referring to FIGS. 9 and 10, the hanger assembly 84 is shown in an unlocked position 184 (FIG. 9) and a locked position 188 (FIG. 10). As shown in FIGS. 9 and 10, a first hanger 24 and a second hanger 28 protrude from the hanger assembly 84. The hanger assembly 84 is compact and may conveniently be stored in a small space and produced for attachment to the rearward facing surface 32 of the passenger seatback 20. The hanger assembly 84 includes a housing assembly 192. The housing assembly 192 includes an outward facing portion 196, a seatback facing portion 200, and a plurality of fasteners 201 that couple the outward facing portion 196 to the seatback facing portion 200. When the hanger assembly 84 is assembled, portions of first and second hangers 24, 28 extend from the outward facing portion 196. Portions of first and second lock members 208, 212 extend from the seatback facing portion 200. The first and second hangers 24, 28 are rotationally coupled with first and second lock members 208, 212. A first fastener 204 couples the first hanger 24 to the first lock member 208. A second fastener 206 couples the second hanger 28 to the second lock member 212.

The hanger assembly 84 is selectively and alternatively positionable in respective first and second positions to respectively detach or attach the hanger assembly 84 to a third bracket 120 of a seatback frame assembly 104. In the depicted embodiment, the first position of hanger assembly 84 is unlocked position 184 (FIG. 9), and the second position of hanger assembly 84 is locked position 188 (FIG. 10). The first position may be referred to as the unfixed position. The second position may be referred to as the fixed position. The first and second hangers 24, 28 and the first and second lock members 208, 212 are aligned along respective first and second axes 268, 272 transverse to the third bracket 120. Typically, the centerlines of the first and second hangers 24, 28 and the first and second lock members 208, 212 define the first and second axes 268, 272. A first fastener 204 is disposed along a first axis 268, and the first fastener 204 couples the first hanger 24 to the first lock member 208. A second fastener 206 is disposed along a second axis 272, and the second fastener 206 couples the second hanger 28 to the second lock member 212. The first hanger 24 is disposed on a first side 276 of the outward facing portion 196 of the housing assembly 192 and the second hanger 28 is disposed on a second side 280 of the outward facing portion 196 of the housing assembly 192. In the depicted aspect, the first side 276 and the second side 280 are on opposing sides of the hanger assembly 284. The hanger assembly 84 includes a gear assembly 202. The gear assembly 202 is disposed on the ends of the first and second hangers 24, 28 with respective first and second anti-rotation features 284, 286. The gear assembly 202 includes a first gear part 288 disposed around the first anti-rotation feature 284 of the first hanger 24 and a second gear part 290 disposed around the second anti-rotation feature 286 of the second hanger 28. When the housing assembly 192 is in the assembled condition, the housing assembly 192 encloses the first and second gear parts 288, 290. The first and second gear parts 288, 290 are rotationally coupled to the respective first and second hangers 24, 28. The first and second gear parts 288, 290 form an interference fit to stabilize the respective first and second hangers 24, 28. The interference fit includes an interface between a first set of teeth 296 disposed about a first circular perimeter 298 of the first gear part 288 and a second set of teeth 300 disposed about a second circular perimeter 302 of the second gear part 290.

With reference to FIGS. 9-10, the first hanger 24 is selectively movable from the unlocked position 24a (FIG. 9) to a locked position 24b (FIG. 10) to activate the first lock member 208 to attach the hanger assembly 84 to the third bracket 120. The second hanger 28 is simultaneously selectively movable from the unlocked position 28a to a locked position 28b to activate the second lock member 212 to attach the hanger assembly 84 to the third bracket 120. In the unlocked position 24a, the first hanger 24 is in a substantially vertical position. In the locked position 24b, the first hanger 24 is in a substantially horizontal position. The first hanger 24 is rotated in a counterclockwise direction 304 from the unlocked position 24a to the locked position 24b. In the unlocked position 28a, the second hanger 28 is in a substantially vertical position. In the locked position 28b, the second hanger 28 is in a substantially horizontal position. The second hanger 28 is rotated in a clockwise direction 308 from the unlocked position 28a to the locked position 28b.

When the first and second hangers are in the unfixed position (unlocked positions 24a, 24b), then the outer peripheries 209, 213 of the first and second lock members 208, 212 are insertable into the inner peripheries 126, 127 of the third aperture 121 and the fourth aperture 122 of the third bracket 120.

The first and second lock members 208, 212 move from a first state (unlocked position 208a, 212a) (FIG. 9) to a second state (locked position 208b, 212b) (FIG. 10) when the first and second hangers 24, 28 move from an unlocked position 24a, 28a to a locked position 24b, 28b.

Referring again to FIGS. 9-10, the seatback facing portion 200 of the housing assembly 192 includes a seatback facing surface 328. The seatback facing surface 328 may be slanted so that it can align with the contour of a seatback 20. The seatback facing portion 200 of the housing assembly 192 includes registration knobs 332 with holes 336 for receiving fasteners 201 for securing the seatback facing portion 200 of the housing assembly 192 to the outward facing portion 196 of the housing assembly 192. The housing assembly 192 typically partially encloses the first and second hangers 24, 28 and the first and second lock members 208, 212.

Figure 11:
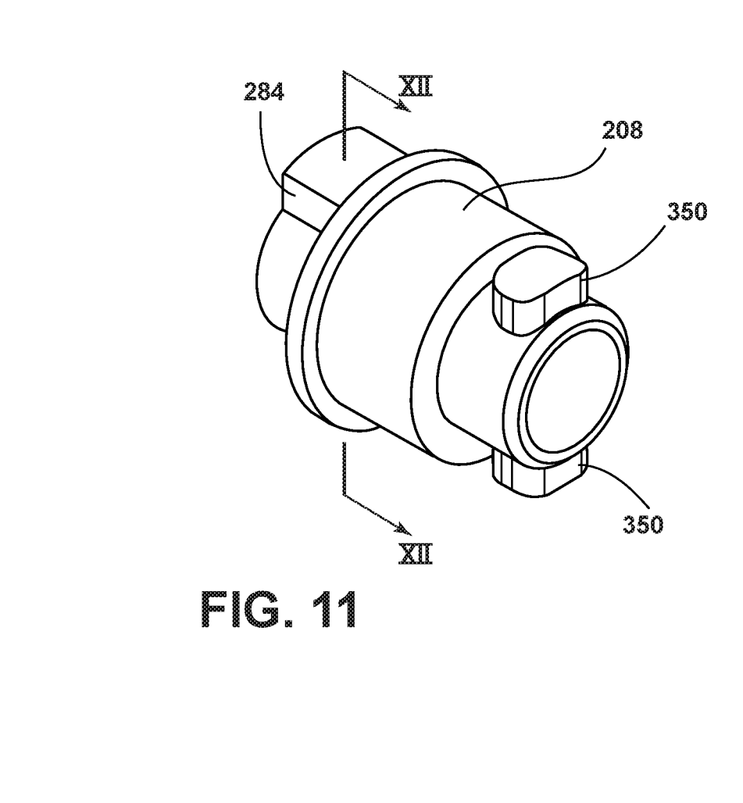
FIG. 11 is a side perspective view of a lock member of an embodiment.
Figure 12:
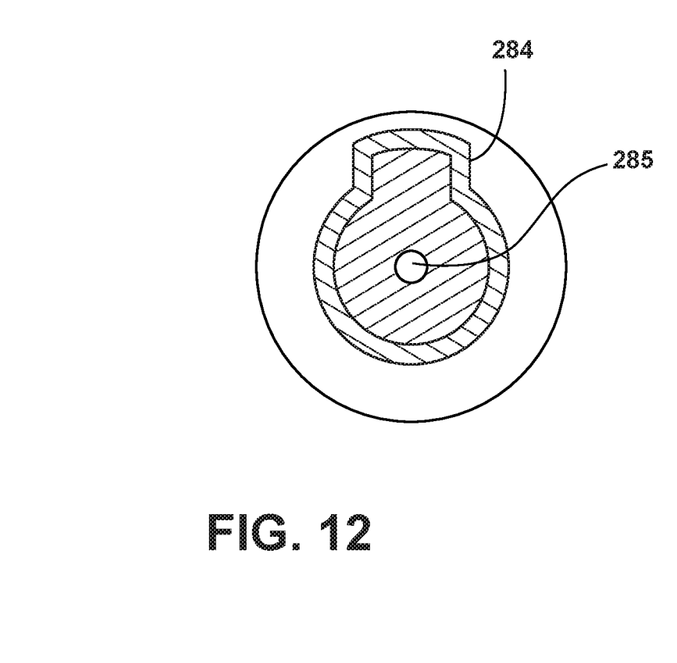
FIG. 12 is a cross-sectional view taken along line XII-XII of FIG. 11 according to an embodiment.

With reference to FIGS. 11-12, a first locking member 208 is shown. The first locking member 208 includes a first anti-rotation feature 284 for attaching the first locking member 208 to the first hanger 24. The first locking member 208 includes first nubs 350 disposed on opposed sides of the first locking member 208. FIG. 12 is a cross-sectional view of the first locking member 208 taken along line XII-XII of FIG. 11. A hole 285 for receiving a fastener 204 (FIGS. 9 and 10) is disposed in the first anti-rotation feature 284.

Figure 13:
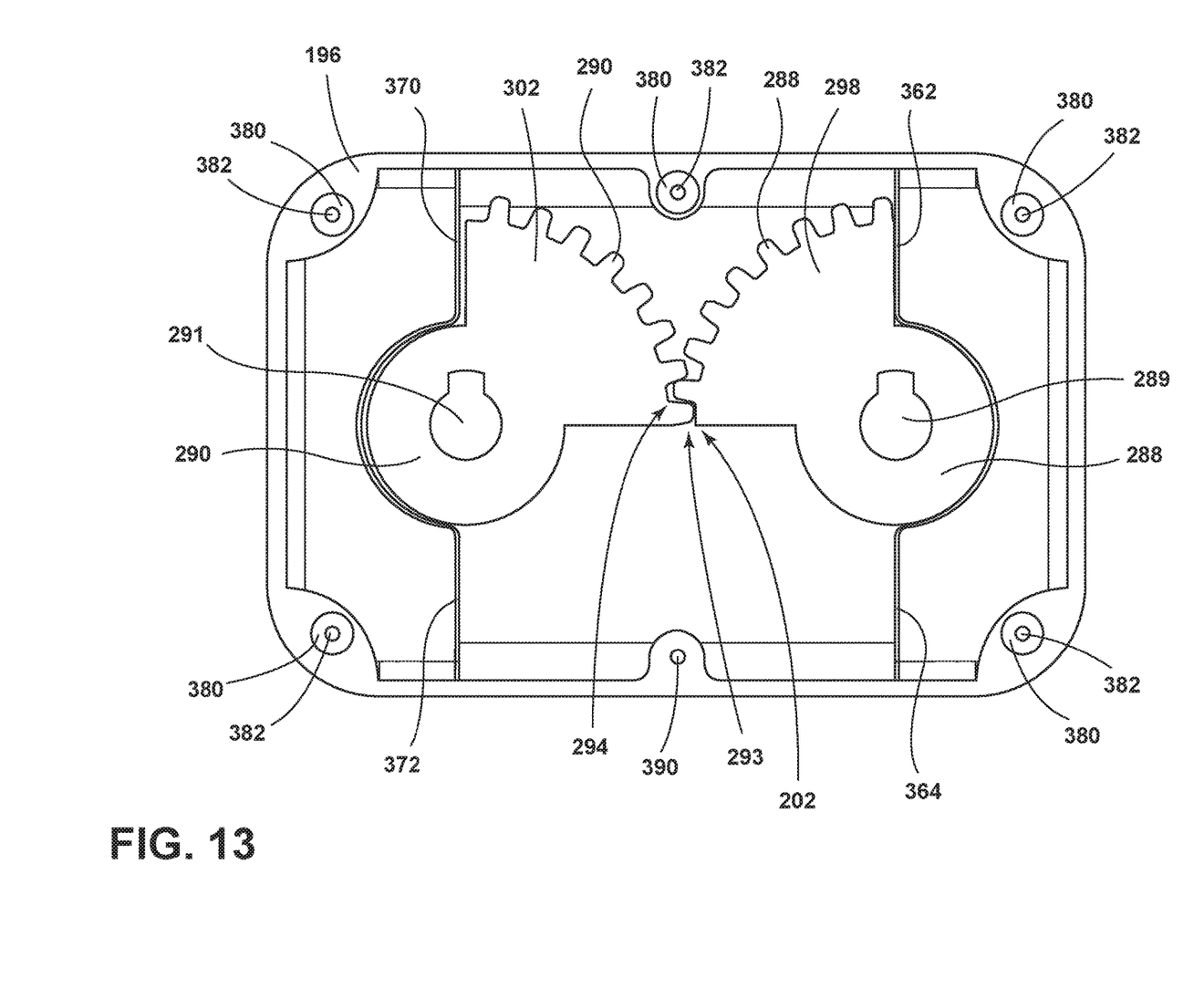
FIG. 13 is a partial elevational view of a portion of the housing assembly of an embodiment.
Figure 14:
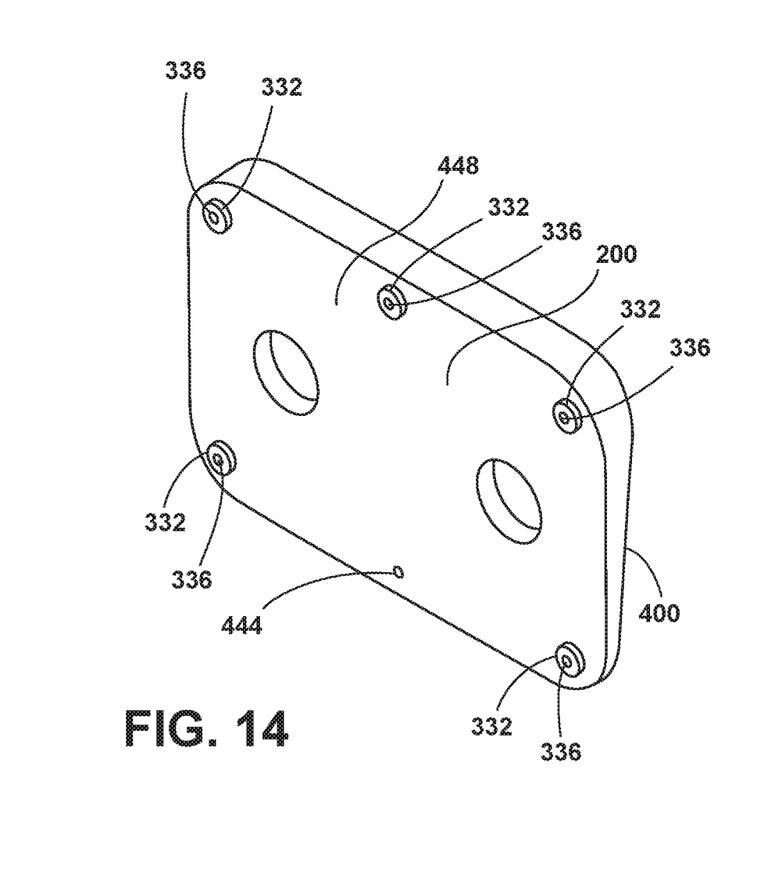
FIG. 14 is a front perspective view of a second portion of the housing assembly of an embodiment.
Figure 15:
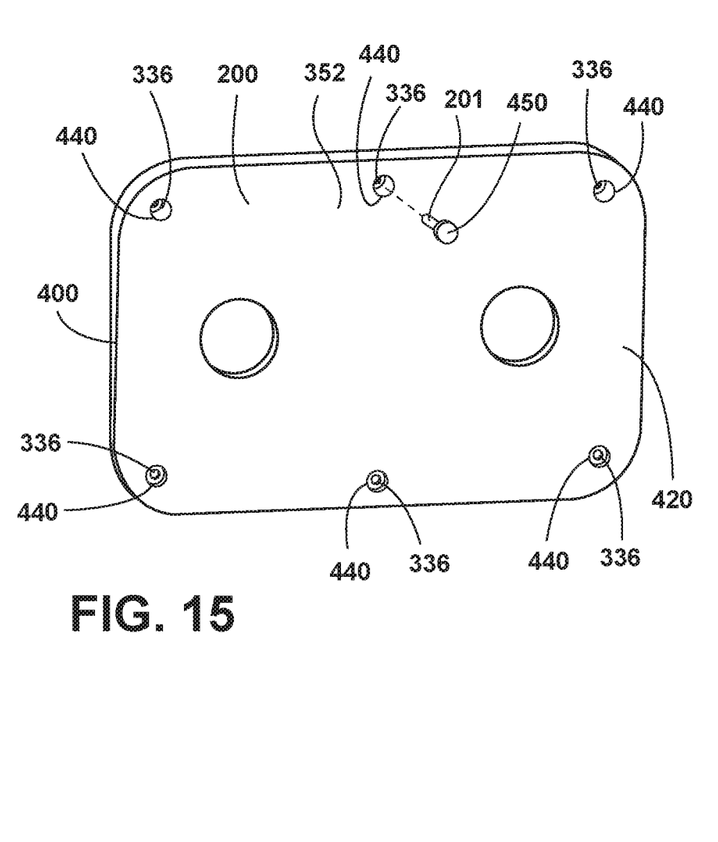
FIG. 15 is a rear elevational view of the second portion of the housing assembly of FIG. 14.

Referring now to FIGS. 13-15, the outward facing portion 196 (FIG. 13) and the seatback facing portion 200 (FIGS. 14 and 15) of the housing assembly 192 are shown. With regard to FIG. 13, the outward facing portion 196 includes a first gear part 288 and a second gear part 290 of the gear assembly 202. The first gear part 288 is proximate a first upper stop 362 and a first lower stop 364. The second gear part 290 is proximate a second upper stop 370 and a second lower stop 372. The first gear part 288 and the second gear part 290 have a first aperture 289 and a second aperture 291 that correspond with the first anti-rotation feature 284 of the first hanger 24 and the second anti-rotation feature 284 of the second hanger 28 to which the first gear part 288 and the second gear part 290 are coupled. An interface 293 formed by interlocking teeth 294 couples the motion of the first hanger 24 to the motion of the second hanger 28 and vice versa. That is, if the user rotates the first hanger 24, then the rotation of the first gear part 288 will cause rotation of the second gear part 290 and the second handle 28. Similarly, if the user rotates the second hanger 28, then the rotation of the second gear part 290 will cause the first gear part 288 and the first hanger 24 to rotate. Typically, a user simultaneously rotates the first hanger 24 and the second hanger 28 from the first position 24a, 28a to the second position 24b, 28b to attach the hanger assembly 84 to the third bracket 120 of the frame assembly 104. Typically, a user simultaneously rotates the first hanger 24 and the second hanger 28 from the second position 24b, 28b to the first position 24a, 28a to detach the hanger assembly 84 from the third bracket 120 of the frame assembly 104.

Referring again to FIG. 13, the outward facing portion 196 includes recesses 380 for receiving registration knobs 332 from the seatback facing portion 200 of the housing assembly 192. Also, a locator 390 is located on the outward facing portion 196.

Referring to FIG. 14, the seatback facing portion 200 of the housing assembly 192 is shown. The registration knobs 332 protrude from an inside wall 448 of the seatback facing portion 200. The registration knobs 332 are received by the recesses 380 (FIG. 13) of the outward facing portion 196.

Referring now to FIG. 15, the seatback facing portion 200 of the housing 192 includes an outside wall 420. The outside wall 420 includes cavities 440 for receiving the fasteners 201 that will connect the seatback facing portion 200 of the housing assembly 192 to the outward facing portion 196 of the housing assembly 192. The cavities 440 provide space for fastener tips 450.

In various embodiments, the hanger assembly may be used in locations other than or in addition to the front passenger seat 16.

A variety of advantages may be derived from use of the present disclosure. A universal system of attachment points on the passenger seatback allows for a variety of useful features to be added and secured to the seat frame. The disclosure allows for customization of interior features. Vehicle interior space is limited, and the disclosure makes use of a previously unused surface (i.e., the rearward facing seatback surface) to add more functionality to the vehicle interior while maintaining the functionality of a standard passenger seat and preserving passenger leg room and seating space. A storage member may be attached to a vehicle facing seatback surface when the passenger would like to use the feature of the storage member. A storage member may be removed and stored when it is not needed and when additional passenger space is desired.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seat;
   a seatback comprising a seatback frame and a rearward facing surface; and
   a selectively attachable hanger assembly disposed on the rearward facing surface and mounted to a bracket attached to the seatback frame, the bracket including an aperture,
   wherein the hanger assembly is rotationally mounted through the aperture to form an interference fit between the hanger assembly and the bracket.

2. The vehicle seating assembly of claim 1, wherein the hanger assembly includes a hanger, a lock member, and a housing assembly that partially encloses the hanger and the lock member, wherein the hanger and the lock member are rotationally coupled along an axis defined by centerlines of the hanger and the lock member, and wherein the hanger is movable from a first position to a second position to move the lock member from a first state to a second state.

3. The vehicle seating assembly of claim 2, wherein the first state comprises an unfixed position and the second state comprises a fixed position.

4. The vehicle seating assembly of claim 3, wherein the unfixed position includes an outer periphery of a lock member disposed within an inner periphery of an aperture of the bracket.

5. The vehicle seating assembly of claim 4, wherein the hanger is rotated from the first position to the second position to move the lock member from the unfixed position to the fixed position.

6. The vehicle seating assembly of claim 5, wherein in the fixed position, the interference fit is formed between a nub of the lock member and a seatback facing surface of the bracket.

7. The vehicle seating assembly of claim 6, wherein the hanger comprises a first hanger and a second hanger disposed on opposing sides of the housing assembly.

8. The vehicle seating assembly of claim 7, wherein a gear assembly is disposed within the housing assembly and between the first hanger and the second hanger.

9. The vehicle seating assembly of claim 2, wherein the first position includes the hanger in a substantially vertical position and the second position includes the hanger in a substantially horizontal position.

10. A hanger assembly for a seatback, comprising: a housing assembly comprising outward facing and seatback facing portions; a hanger extending from the outward facing portion; and a lock member extending from the seatback facing portion and rotationally coupled with the hanger, wherein the hanger is selectively and alternatively positionable in first or second positions to respectively detach or attach the hanger assembly to a seatback frame assembly.

11. The hanger assembly for a seatback of claim 10, wherein the hanger and the lock member are aligned along an axis transverse to a seatback surface, wherein a fastener is disposed along the axis, and wherein the fastener couples the hanger to the lock member.

12. The hanger assembly for a seatback of claim 11, wherein the hanger comprises a first hanger and a second hanger disposed on a first side and a second side of the housing assembly.

13. The hanger assembly for a seatback of claim 12, wherein a first gear part of a gear assembly is disposed around the first hanger and a second gear part of the gear assembly is disposed around the second hanger, wherein the housing assembly encloses the first and second gear parts, wherein the first and second gear parts are rotationally coupled to the respective first and second hangers, and wherein the first and second gear parts form an interference fit to stabilize the first and second hangers.

14. The hanger assembly for a seatback of claim 13, wherein the interference fit comprises an interface between a first set of teeth disposed about a first circular perimeter of the first gear part and a second set of teeth disposed about a second circular perimeter of the second gear part.

15. The hanger assembly for a seatback of claim 14, wherein the first hanger is selectively movable from a first position to a second position to activate a first lock member to attach the hanger assembly to the seatback frame assembly and wherein the second hanger is simultaneously selectively movable from a first position to a second position to activate a second lock member to attach the hanger assembly to the seatback frame assembly.

16. The hanger assembly for a seatback of claim 15, wherein the first position of the first hanger is a substantially vertical position, and the second position of the first hanger is a substantially horizontal position, and wherein the first hanger is rotated in a counterclockwise direction from the substantially vertical position of the first hanger to the substantially horizontal position of the first hanger, and wherein the first position of the second hanger is a substantially vertical position, and the second position of the second hanger is a substantially horizontal position, and wherein the second hanger is rotated in a clockwise direction from the substantially vertical position of the second hanger to the substantially horizontal position of the second hanger.

17. A system of attachment points for a vehicle seatback, comprising: a seatback comprising a frame assembly including first, second, and third brackets having respective first, second, and third apertures; and a selectively attachable storage member comprising a mounting member for securing the selectively attachable storage member to the third aperture of the third bracket.

18. The system of attachment points for a vehicle seatback of claim 17, wherein the selectively attachable storage member comprises a first mounting member and a second mounting member and wherein the first mounting member is inserted in the first aperture of the first bracket and the second mounting member is inserted in the second aperture of the second bracket.

19. The system of attachment points for a vehicle seatback of claim 18, wherein the selectively attachable storage member is a panel assembly.

20. The system of attachment points for a vehicle seatback of claim 17, wherein the selectively attachable storage member is a hanger assembly.

\* \* \* \* \*